United States Patent [19]

Mischenko

[11] Patent Number: 5,117,073
[45] Date of Patent: May 26, 1992

[54] CONTROL SIGNAL INITIATOR RESPONSIVE TO A HINGE POSITION

[75] Inventor: Nicholas Mischenko, Mt. Prospect, Ill.

[73] Assignee: Motorola, Inc., Schaumburg, Ill.

[21] Appl. No.: 679,401

[22] Filed: Apr. 2, 1991

[51] Int. Cl.⁵ .................... H01H 3/16; H04R 1/00
[52] U.S. Cl. .................... 200/61.7; 379/433
[58] Field of Search ............ 200/5 R, 5 A, 11 R, 200/11 K, 61.62, 61.7; 379/433, 1

[56] References Cited

U.S. PATENT DOCUMENTS

| | | | |
|---|---|---|---|
| 3,170,047 | 2/1965 | Mairs et al. | 200/11 R |
| 3,663,774 | 5/1972 | Feder | 200/43.06 |
| 3,860,771 | 1/1975 | Lynn et al. | 200/5 R X |
| 4,114,000 | 9/1978 | Feder | 200/16 R |
| 4,405,841 | 9/1983 | Van Zeeland | 200/11 K X |
| 4,897,873 | 1/1990 | Beutler et al. | 379/433 |

FOREIGN PATENT DOCUMENTS

1333034 10/1973 United Kingdom .............. 200/61.7

*Primary Examiner*—J. R. Scott
*Attorney, Agent, or Firm*—Kevin D. Kaschke; Kenneth W. Bolvin; Roland R. Hackbart

[57] ABSTRACT

A hinge actuated switch apparatus initiates a control signal responsive to the rotational movement of a flip element (103) on a radiotelephone unit (100). The radiotelephone unit's circuitry senses of whether the flip element (103) is in a closed or open position. The integrated miniature switch comprises a pin (223) attached eccentrically to one end of a hinge (221) on the flip element (103). As the flip element (103) is rotated, the pin (223) drives a push rod (203) to compress a conductive elastomeric pad (205) thereby electrically connecting normally open conductive circuit pads (234 and 236), on the surface of a printed circuit board (201).

17 Claims, 6 Drawing Sheets

CONTROL SIGNAL INITIATOR RESPONSIVE TO A HINGE POSITION

FIELD OF THE INVENTION

The present invention relates to hinged housings for minature electronic equipment, and more particularly to an portable radiotelephones which utilize hinged housings initiating a control signal responsive to the position of the hinge.

BACKGROUND OF THE INVENTION

It is generally known that cam mechanisms are used to produce repetitive cycles of linear displacement. A particular application requiring linear displacement is the activation of a switch. A cam rotating in a first direction causes the switch to close thereby creating a short circuit. The cam rotating in a second direction, causes the switch to open thereby causing an open circuit.

A cam operated switch typically comprises a cam attached to a shaft and conventional push button, limited travel switch. A limited travel switch has a finite actuation distance and does not allow the switch plunger to continue traveling after switch contact has been made. The push button switch is typically wired or hand soldered to a printed circuit board such that the switch's open state or closed state is recognized by associated circuitry.

Significant problems arise when implementing the cam operated switch concept to very small switches, otherwise known as microswitches. One type of microswitch comprises a plunger which collapses a metal dome under pressure. The plunger and metal dome are enclosed within a switch housing. Typically, two terminals exit the switch housing for detecting an open or collapsed dome state.

Problems associated with microswitches include a short actuation travel distance and no capability for over travel. The sensitive actuation nature of the microswitch requires precise cam dimensions and precise positioning of the cam above the switch plunger. The cam must rotate from its first position to its second position causing the plunger to collapse the dome over a very short distance. Since the microswitch does not have the capability of over travel (further actuation of the plunger beyond the point after the switch makes contact), the cam must stop exerting force at the actuation distance otherwise damage to the switch may occur. Manufacturing tolerance buildup resulting form this cam operated switch produces a frequently unreliable mechanism. Tolerances affecting the mechanism include soldering the microswitch to a printed circuit board, positioning of the printed circuit board, manufacturing of the microswitch itself, manufacturing of the cam, rotation of the cam and positioning of the cam above the switch plunger.

Advances in microelectronic devices demand smaller, inexpensive and easily manufactured switching mechanisms which current standard microswitches do not fulfill. Therefore, there is a need for a reliable miniature switching mechanism responsive to rotational movement which overcomes the aforementioned unavoidable problems.

SUMMARY OF THE INVENTION

A hinge actuated switch apparatus has a first and a second housing portion. The first housing portion is capable of rotational movement between a first and a second position relative to the second housing portion. A cylindrical hinge shaft, attached to one end of the first housing portion, rotatably couples the first housing portion to the second housing portion about an axis of rotation through a diametric center of the hinge shaft. A planar substrate is positioned within the second housing portion parallel to the axis of the axis of rotation. A push rod is perpendicularly disposed to the axis of rotation and having a free end capable of linear movement between a first and a second position within the second housing. The rotation movement of the first housing portion between the first and the second position is translated to the linear movement of the free end of the push rod between the first and the second position, respectively. A switch, mounted to the substrate and opposing the free end of the push rod, has an open circuit state when the free end of the push rod is in the first position and a closed circuit state when the free end of the push rod is in the second position.

DETAILED DESCRIPTION OF THE PREFERRED EMBODIMENT

Figure 1:
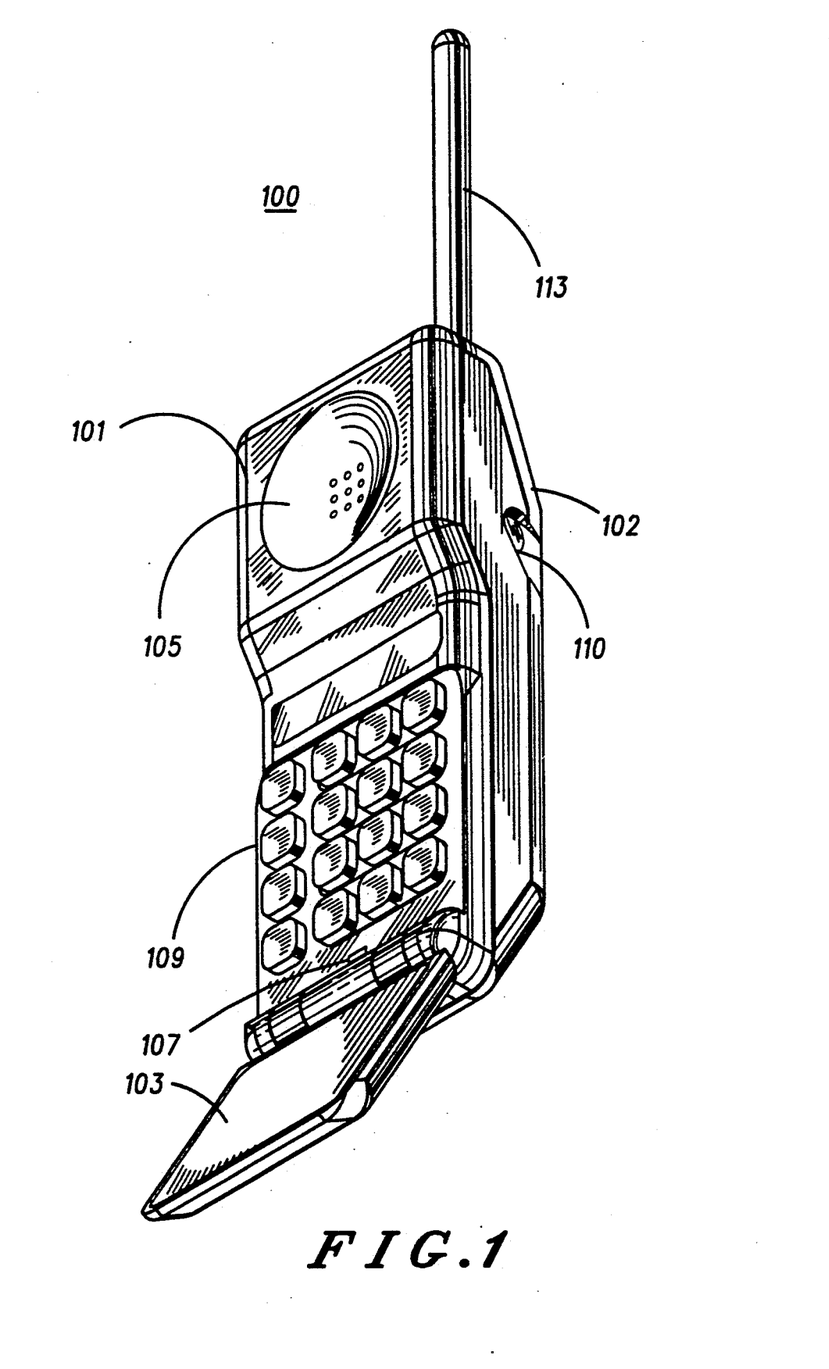
FIG. 1 is an isometric drawing of a radiotelephone handset constructed in accordance with the present invention.

A portable radiotelephone adapted to be used in a cordless radiotelephone system is shown in FIG. 1. The present invention may be employed in such a portable radiotelephone as well as in other miniature electronic equipment. The illustrated portable unit consists of two external portions, a body portion having a front housing 101 and a rear housing 102, and a flip element portion 103. The drawing of FIG. 1 shows the flip element 103 in an "open" position such that a user of the portable unit may listen via earpiece 105 and may speak into a microphone 107. A telephone dial, or keypad, 109 consists of a plurality of buttons numbered 1 through 0, #, and *, in a familiar telephone arrangement. The keypad 109 also has additional function buttons such as channel select, volume control, on/off, and other buttons associated with telephone number recall. A charging contact 110 enables a battery within the portable radiotelephone 100 to be recharged when mechanically coupled to a mating contact on a base station (not shown). An antenna 113 enables wireless communication between the portable unit and a remote base site (not shown). A ringer (not shown) located in the back portion of the radiotelephone's housing 102 alerts the user of an incoming call or a low battery condition.

When the portable unit is not in use the flip element 103 is in a closed position such that the at least a portion of the keypad 109 is hidden. Upon receiving an alert signal from ringer, the user opens the flip element 103 to a predetermined position as shown. The rotational movement of the flip element 103 from a closed position, covering the keypad 109, to an open position, exposing the keypad, generates a control signal enabling the portable unit to answer the phone call. Likewise, the rotational movement of the flip element 103 from an open position to a closed position will terminate an active phone call. With the flip element 103 in its closed position, the portable unit is in standby mode and ready to receive another call. Thus, the rotational movement of the flip element 103 from a first predetermined position to a second predetermined position simulates a hook switch used with conventional landline telephones.

Figure 2:
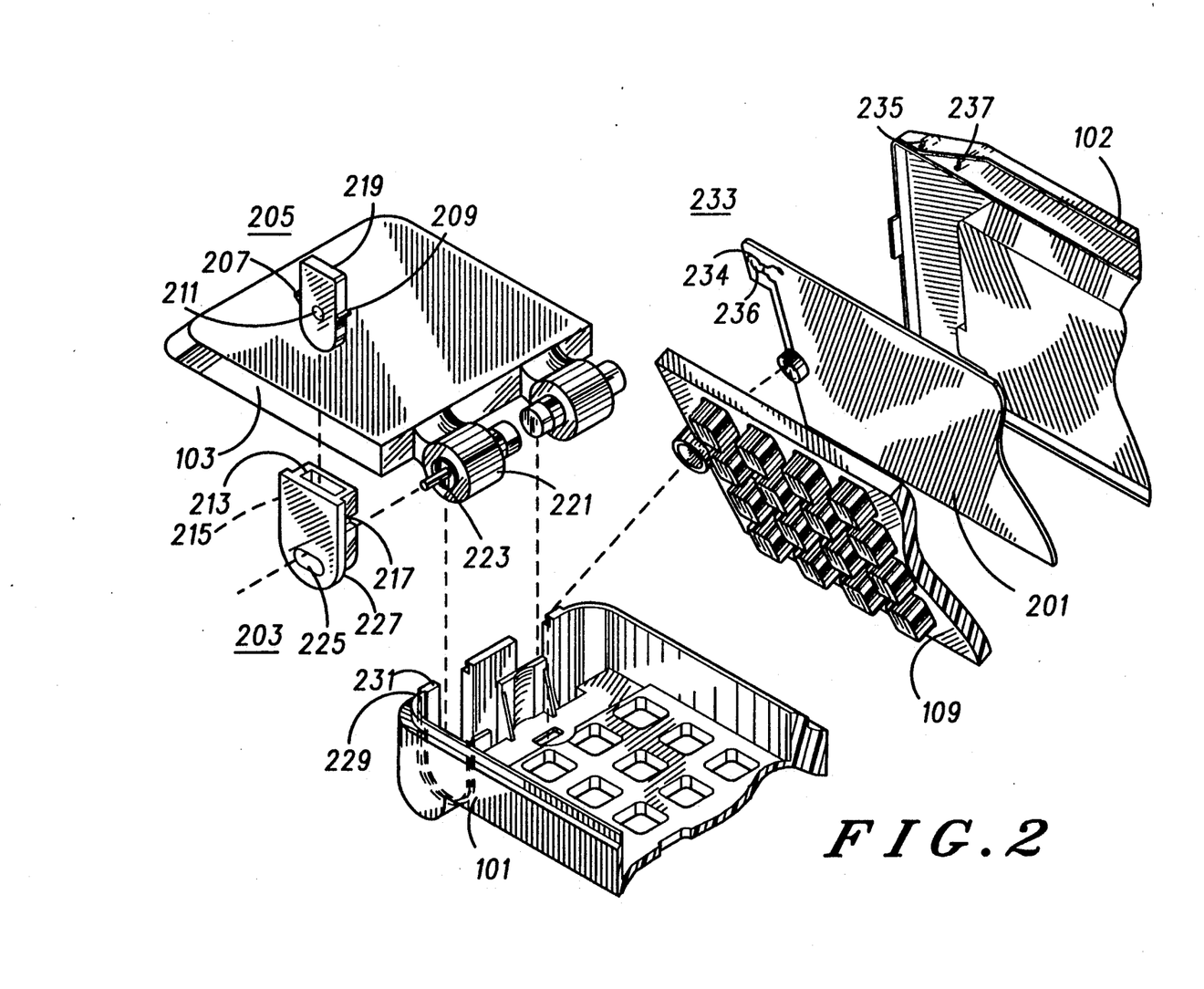
FIG. 2 is an exploded isometric view of a portion of the radiotelephone handset shown in FIG. 1.

FIG. 2 is an exploded isometric view of a portion of the portable unit as shown in FIG. 1. The parts shown comprise a front housing 101, a rear housing 102, a printed circuit board (PCB) 201, the keypad 109, the flip element 103, a push rod 203 and a pad 205. The preferred embodiment of the present invention is constructed through an integral assembly of the aforementioned parts.

The pad 205 is made of conductive resilient silicone rubber having durometer (i.e. a hardness factor) of fifty and a dry resistivity of five ohm-cm maximum. Alternate embodiments may use a nonconductive silicone rubber with an end surface 219 screened with a conductive carbon contact. The pad 205 also includes two protrusions 207 and 209 for securing the pad 205 to the push rod 203 and an aperture 211 allowing the pad 205 to collapse under pressure.

The push rod 203 includes an opening 213 which accepts the pad 205 until the protrusions 207 and 209 interlock with retaining apertures 215 and 217, respectively, on the push rod 203. A slot 225 in an end portion of the push rod 203 opposite the opening 213 extends from one side through to another opposite side. The retaining apertures 215 and 217 are disposed within opposite and parallel sides. A guide 227, having a flat surface, protrudes from two opposite and essentially parallel sides of the push rod 203 and a curved surface disposed between the two opposite sides.

The flip element 103 includes a pin 223 protruding from an end surface of a hinge 221. The pin 223 is offset from an axis along the center of the hinge 221. The pin 223 is disposed within the slot 225 of the push rod 203. As the hinge 221 rotates about its centered axis, the pin 223 travels along an arc around the center of the hinge 221. The arc path is determined by the distance of the pin from the center of the hinge 221 and the amount of rotation of the hinge 221. The arc path traversed by the pin 223 causes the push rod 203 to move in a linear direction. A relationship between the rotation of the hinge via the flip element 103 and the linear displacement of the push rod 203 is now established. This relationship is critical to the implementation of the present invention. More detail about this relationship will be discussed with FIG. 4A and 4B.

The flip element 103, rotationally attached to the push rod 203, is placed within the front housing 101 such that the guide 227 on the push rod 203 is located within a channel 229 disposed within the front housing 101. The guide 227 and channel 229 slidably intercouple to constrain the linear movement of the push rod 203 and to displace the push rod 203 from a snap element 231 on the front housing 101. The push rod 203 is positioned so that it does not interfere with the snap element 231 on the front housing 101 so that it may freely move to and from the PCB 201 as the flip element 103 is rotated.

The front housing 101, rear housing 102 and flip element 103 are made of a primarily polycarbonate material manufactured by Mobay Plastics Inc. (material number T85MN). The push rod 203 is made from acetone having a trademark called Delrin 500. Delrin has self-lubricating properties which enhance the mechanical coupling between the rotating pin 223 on the flip element 103 and the slot 225 in the push rod 203 (i.e. the parts slide better).

The keypad 109 is disposed within the front housing such that the keys protrude through to the front surface of the front housing 101. The PCB 201 is positioned over the keypad 109 such that the keypad is captivated between the PCB 201 and the front housing 101. The PCB 201 provides the substrate for the circuitry necessary to operate the portable unit. A portion of the circuitry shown, a conductive circuit 233, is disposed on the surface of the PCB 201. The conductive circuit 233 senses when the flip element 103 is in an open or closed position. The conductive circuit 233 includes two "C" shaped conductive contacts 234 and 236 coupled to conventional printed circuit board traces. The two "C" shaped contacts 234 and 236 have conductive carbon deposited thereon for providing oxidation resistant contacts. Alternate embodiments of the present invention may include gold contacts conductive ink or other conductive, oxidation resistant substances. Alternate embodiments of the present invention may also use various shaped contacts and not necessarily limited to "C" shaped contacts.

The aforementioned conductive silicone rubber pad 205 and non-conductive silicone rubber pad with the screened carbon contact on the end 219 have a maximum contact resistance of 500 ohms when shorting gold contacts 234 and 236 on the PCB 109 and 2000 ohms when shorting carbon contacts 234 and 236 on the PCB 109.

With the PCB 201 positioned within the front housing, the conductive circuit 233 is disposed essentially opposite and parallel to the end of the conductive pad 219. A void of about 0.5 mm separates the end of the pad 219 and the conductive circuit 233. The pin 223 should have a diameter sufficient to sustain the pressure applied between the pad 205 and the conductive circuit 233 on the PCB 201.

The rear housing is aligned with the front housing 101 so that the two parts snap together thereby forming the body portion of the portable unit. Two stand-offs support the back of the PCB 201 near the conductive circuit 233 during switch actuation.

Figures 3A, 3B:
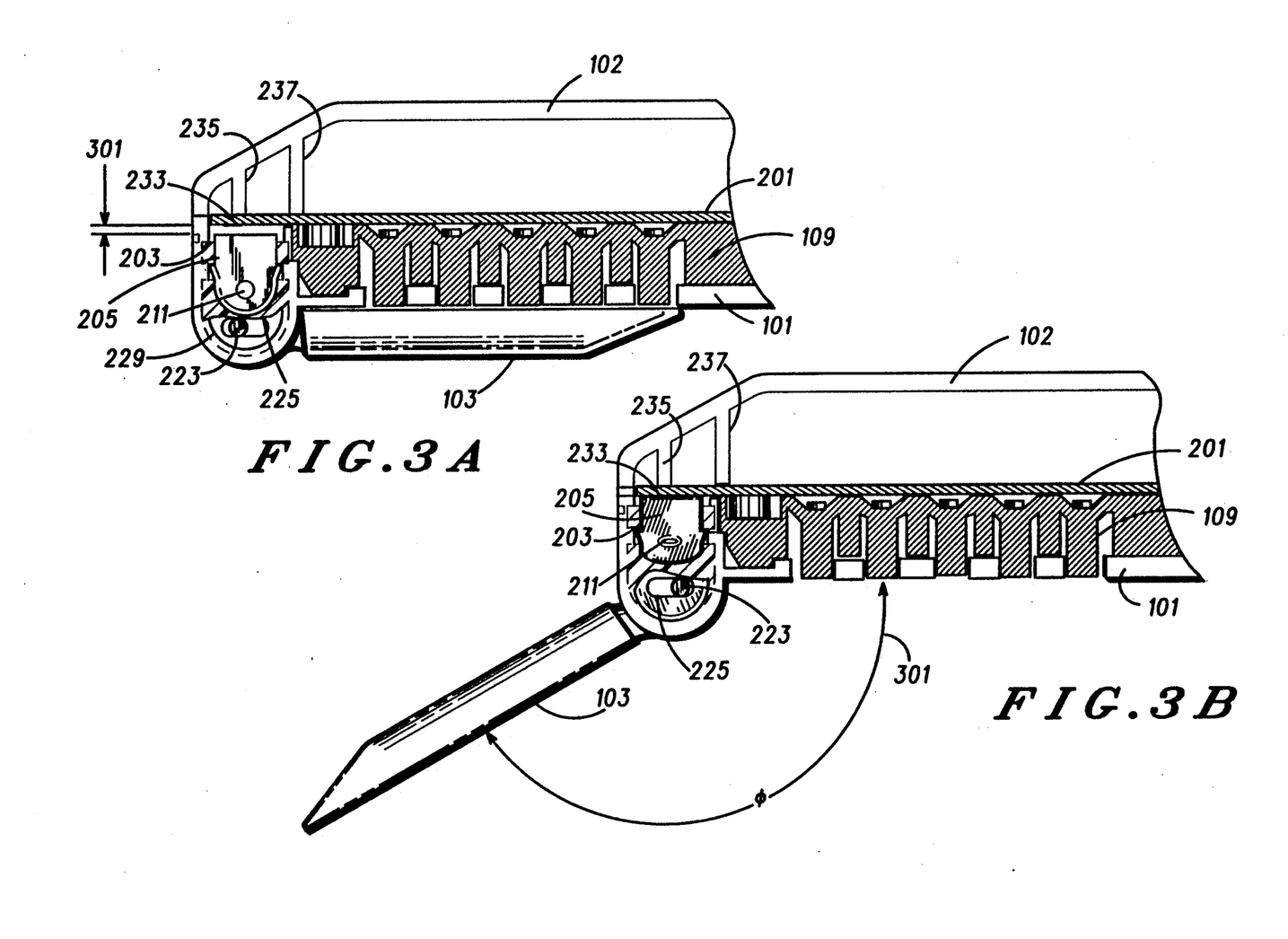
FIG. 3A is a cross-sectional view of a portion of the radiotelephone handset shown in FIG. 1 with its flip element in a closed position utilizing a conductive resilient pad.
FIG. 3B is a cross-sectional view of a portion of the radiotelephone handset of FIG. 1 with its flip element in an open position utilizing a conductive resilient pad.

FIG. 3A illustrates a partial cross-sectional view of a portion of the portable unit as shown in FIG. 1 with the flip element 103 in its closed position. The PCB 201 and the keypad 109 are captivated between the front housing 101 and rear housing 102. Stand-offs 235 and 237 provide support for the PCB 201. The pad 205 is positioned within the push rod 203 such that the pad 205 is isolated from the the conductive circuit 233 by a gap 301. Thus, when the flip element 103 is in its closed position the integral switch is in an open circuit state. An open circuit state is recognized by the portable unit as an "on-hook" condition whereby a call may be received.

FIG. 3B illustrates a portion of the portable unit as shown in FIG. 1 with the flip element in an open position. The flip element 103 is shown an angle of $\phi$ for example 135°, with the surface plane of the front housing 101. As the flip element 103 is opened, the pin 223 within the slot 225 of the push rod 203 causes the push rod 203 to compress the pad 205 against the conductive circuit 233 disposed on the PCB 201. The continuous pressure shorts out the conductive circuit 233. The portable unit senses the short circuit and initiates a signal to its associated circuitry that the flip element 103 is in its open position. Thus, an incoming call may be answered. The aperture 211 is deformed under the pressure exerted by the movement of the push rod 203. Since the pad 205 is made of a fairly dense rubber, the aperture 211 was needed to relieve actuation pressure throughout over travel after actuation contact has been made.

The advantages of the preferred embodiment of the present invention provide a reliable and miniature switching mechanism responsive to the rotational movement of the flip element 103. Since the switch structure integrates the conductive circuit 223 on the PCB 201, the conductive pad 205, the push rod 203 and the pin 223 of the flip element 103, a miniature switching mechanism is employed. Furthermore, tolerance buildup between associated parts has now been eliminated due to the large actuation distance and the capability of applying pressure throughout over travel.

Figure 4A:
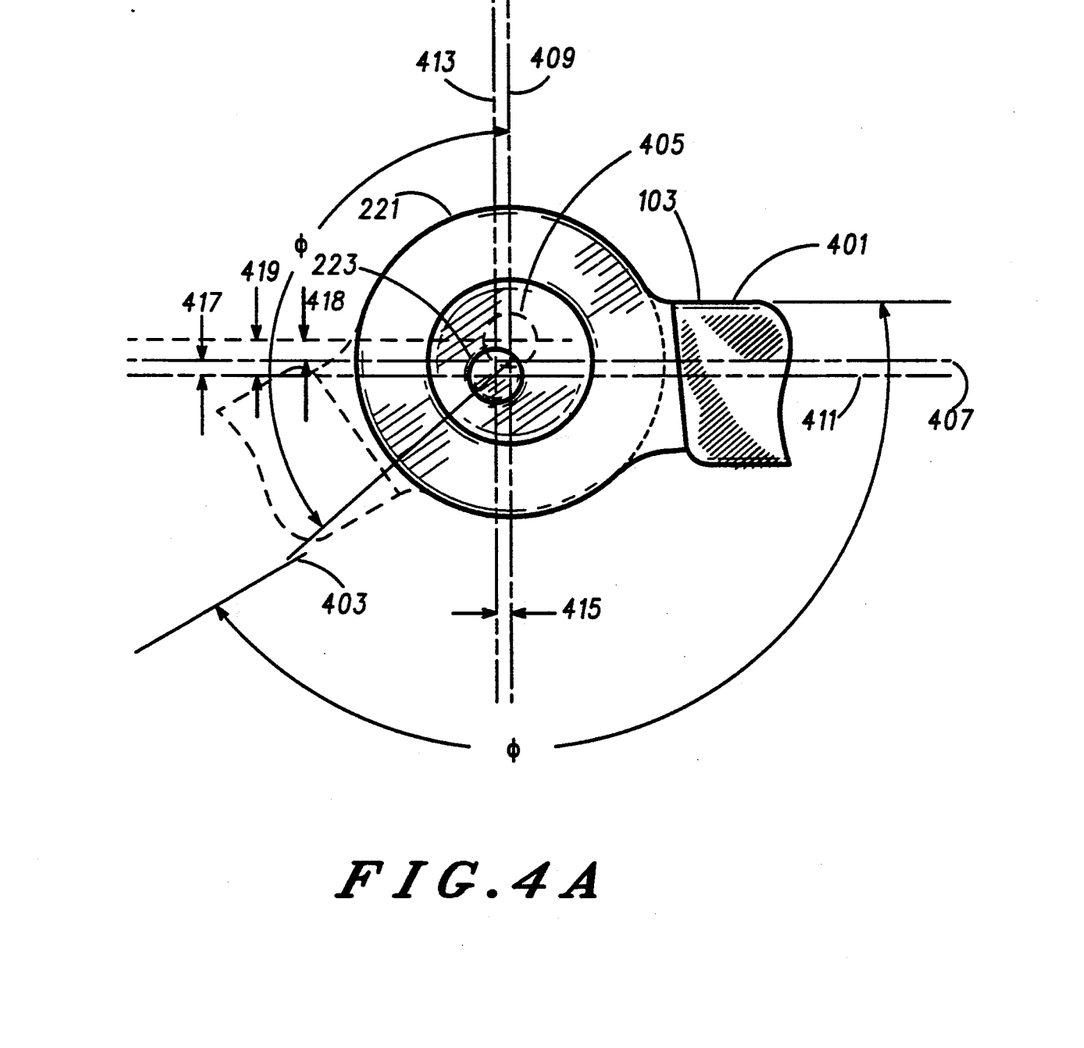
FIG. 4A is an end-view of the hinge portion of the radiotelephone handset's flip element in a closed and open position initiating a continuous control signal.

FIG. 4A illustrates an end view of the hinge portion of the flip element in a closed position 401 (designated by a solid line) and an open position 403 (designated by a dotted line). The angle of rotation is designated by an angle $\phi$. FIG. 4A illustrates the how the rotational motion of the flip element 103 through the angle $\alpha$ translates into a linear direction traversed by the pin 223.

In the closed position 401 the pin 223 has a first predetermined position 404 (solid line). In the open position 403 the pin has moved to a second predetermined position 405 (dotted line). The linear direction traversed from the first predetermined position 404 of the pin 223 to the second predetermined position 405 of the pin over a distance 419 is achieved by offseting the center of the pin 223 from the center of the hinge 221.

The center of the hinge is designated by an orthogonal X axis 407 and Y axis 409. Likewise, the center of the pin 223 is designated by the intersection of an orthogonal X' axis 411 and a Y' axis 413. In the preferred embodiment of the present invention the center of the pin 223 is located 0.7 mm designated by a distance 417 in a negative direction along the Y axis 409 and 0.4 mm designated by a distance 415 in a negative direction along the X axis 407 from the center of the hinge 221. The resulting vector from the center of the hinge 221 to the center of the pin is 0.81 mm long at an angle designated by $\phi$ from the positive Y axis 409.

In the preferred embodiment, the rotational movement of the flip element 103 throughout the angle $\phi$, having 135°, provides a linear displacement at 419 of the pin 223 along the Y axis 409 of 1.51 mm. The displacement of 1.51 mm includes the original displacement at 417 of 0.7 mm in the negative Y direction 409 plus the traversed displacement designated by 418 of 0.81 mm in the positive Y direction 409. As described, rotational movement of the flip element may be translated into precise linear movement of the pin 223. Since the pin 223 is coupled to the slot 225 within the push rod 225, precise switch actuation distance and over various travel conditions may be controlled.

Although the preferred embodiment of the present invention describes specific rotational angles and specific displacement distances determined by the pin 223, variations in the rotational angle $\phi$ and the displacement 418 of the pin 223 relative to the center of the hinge 221 may be employed to achieve many desirable switch actuation distances and over travel conditions. A primary advantage of the precision adjustment of the actuation travel distance and over travel distance is that tolerance variations may be accounted for after the assembly of all relevant parts of FIG. 2 have been considered.

The preferred embodiment of the present invention describes a continuous control signal initiated for the radiotelephone while the flip element is open. By adjusting the location of the center of the pin relative to the center of the hinge, an intermittent control signal may be initiated for the radiotelephone as the flip element is rotated from its closed to its open position. The tolerance build up, duration of contact, pressure of contact and timing of contact related to the rotation of the flip element may be at least partially determined by the combination of the pin location and the size and kind of resilient conductive pad used. The implementation of an intermittent switch actuation responsive to the rotation of the flip element 103 is illustrated in FIG. 4B.

Figure 4B:
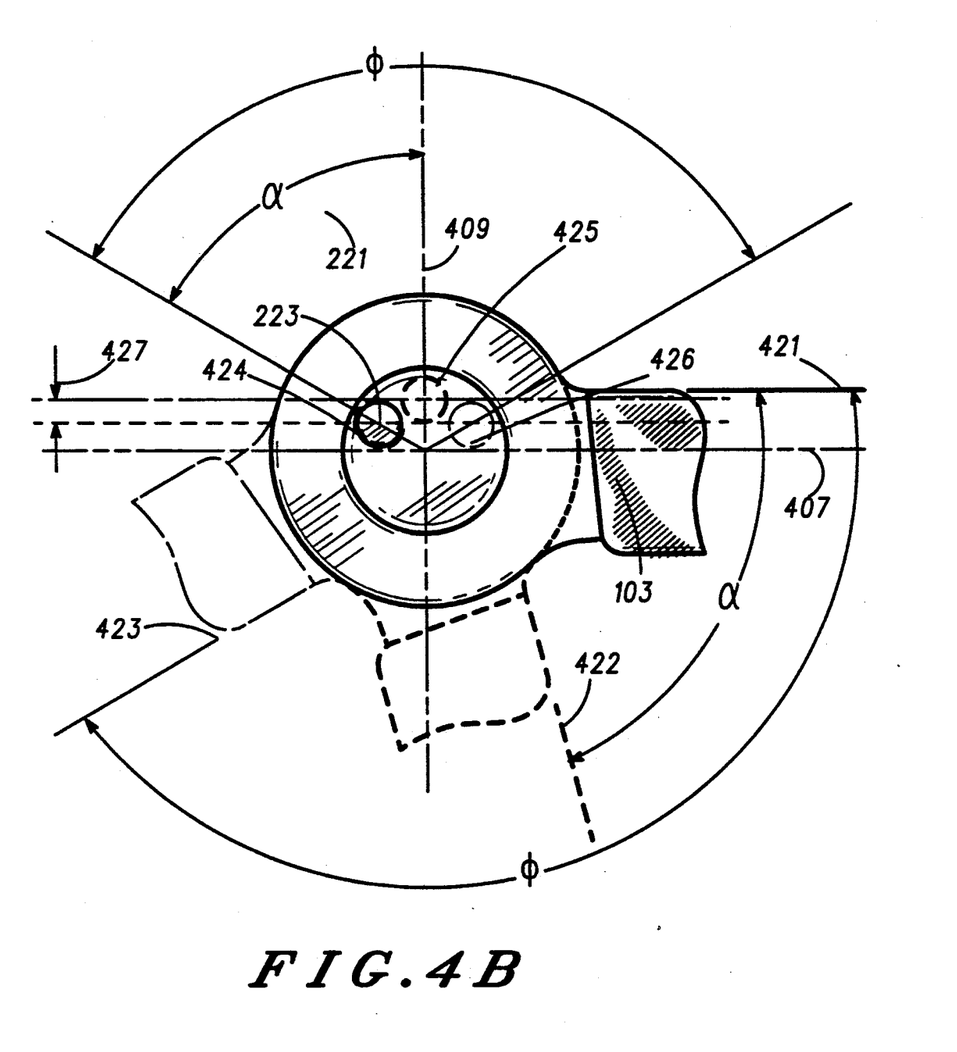
FIG. 4B is an end-view of the hinge portion of the radiotelephone handset's flip element in a closed and open position initiating an intermittent control signal.

FIG. 4B shows the flip element in a first 421, a second 422, and a third 423 predetermined position corresponding to a first 424, a second 425 and a third 426 predetermined position, respectively, of the pin 223. While the flip element 103 is in its first predetermined position at 421, no pressure is applied to the push rod 203. Therefore, the switch is not actuated. Rotating the flip element 103 from the first predetermined position at 421 to the second predetermined position at 422 by an angle $\alpha$ caused the pin 223 to rotate by an angle a resulting in a linear displacement at 427 of the pin 223 in the positive Y direction along the Y axis 409. The pin 223 is now at its second predetermined position at 425 producing a linear force on the push rod to actuate the switch. The linear displacement at 427 is selected to take into account the actuation distance (i.e. the space between the conductive surface on the resilient pad 219 and the conductive circuit 233 on the PCB 201) as well as tolerance variations.

The flip element 103 continues its rotation from its second predetermined position at 422 to an angle $\phi$ causing the pin 223 to rotate through the same angle $\phi$ to its third predetermined position 426. The pin 223 is linearly displaced 427 in the negative Y direction along the Y axis 409 by the displacement at 427 thereby releasing pressure from the push rod 203 to open the switch contact. As the flip element rotates from its first 421, to its second 422 and on to its third 423 predetermined position, the conductive circuit 233 on the PCB 201 is open circuit, closed circuit and then open circuit again, respectively. Therefore, an intermittent switch contact responsive to a rotating flip element has been described.

One skilled in the art may recongnize that variations in the angles α and φ may be made to accommodate various switching activation points and tolerance dimensions by repositioning the center of the pin 223 about the center of the hinge 221.

As discussed in the aforementioned text, a primary feature of the present invention is the integration of the pin, push rod, conductive pad and PCB contacts. These elements make up the essential part of a switch, namely, an actuation means, housing, shorting means and a conductive open circuit. Alternate embodiments of the present invention may be employed without departing from the spirit and scope of the present invention.

Figures 5A, 5B:
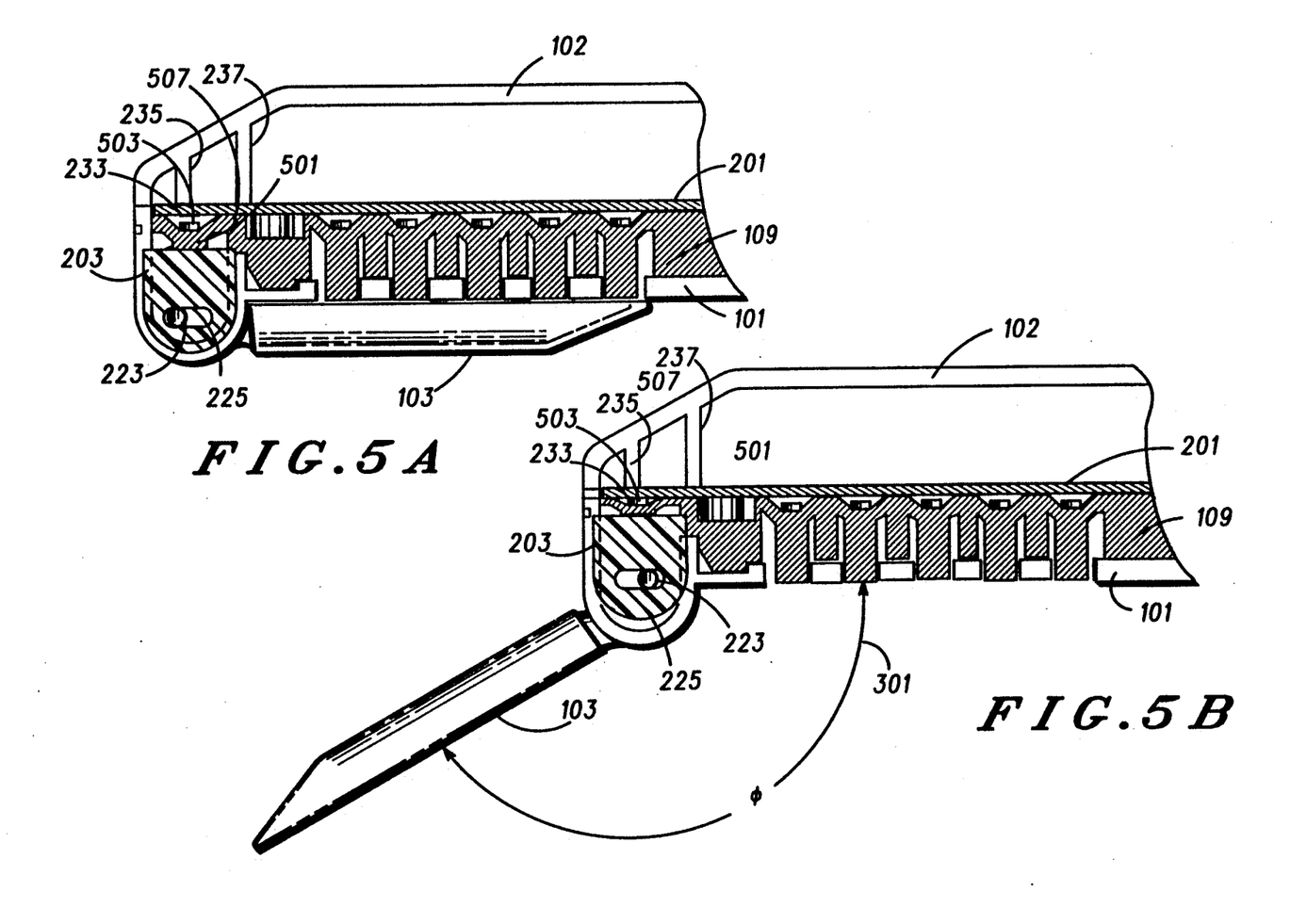
FIG. 5A is a cross-sectional view of a portion of the radiotelephone handset shown in FIG. 1 with its flip element in a closed position utilizing a key switch.
FIG. 5B is a cross-sectional view of a portion of the radiotelephone handset of FIG. 1 with its flip element in an open position utilizing a key switch.

One such alternate embodiment may comprise extending a portion of the keypad 109 including one additional key 501 over the conductive circuit 233 on the PCB 109 as shown in FIG. 5A and FIG. 5B. FIG. 5A illustrates the key 501 in an open circuit position when the flip element 103 is closed. FIG. 5B illustrates the key 501 in a closed circuit position when the flip element 103 is open. This embodiment replaces the pad 205 in the preferred embodiment with a key 501 similar to those on the keypad. The keypad 109 is conventionally made of silicone rubber. Each key has a conventional carbon contact 503 disposed thereon between the key 501 and the PCB 201 for shorting the conductive circuitry 233 when the key 501 is depressed. Each key also employs a conventional membrane border 507 surrounding each key 501 and attaching the key 501 to other keys on the keypad 109 which maintains the carbon contact 503 on the key 501 at a fixed distance from the conductive circuitry 233. The membrane boarder 507 collapses when linear pressure on the push rod 203 is applied to the key 501 by the rotating pin 223 thereby allowing the carbon contact 503 on the switch to short out the conductive circuitry 233. The push rod 203 may be solid or hollow.

Therefore, the problems of prior switching mechanisms regarding size and tolerance have been resolved and a novel, reliable, miniature switch mechanism for providing continuous or intermittent contact responsive to rotational movement of a hinge has been disclosed.

What is claimed is:

1. A hinge actuated switch apparatus for an electronic device having a first and a second housing portion, the first housing portion capable of rotational movement between a first and a second position relative to the second housing portion, the hinge actuated switch apparatus comprising:
   an essentially cylindrical hinge shaft, attached to one end of the first housing portion, rotatably coupling the first housing portion to the second housing portion about an axis of rotation through a diametric center of the hinge shaft;
   an essentially planar substrate positioned within the second housing portion essentially parallel to the axis of rotation;
   a push rod, perpendicularly disposed to the axis of rotation and having a free end capable of linear movement between at least a first and a second position within the second housing portion;
   means for translating the rotational movement of the first housing portion between the first and the second position to the linear movement of the free end of the push rod between the first and the second position, respectively;
   a first and a second conductive contact on the substrate and essentially opposite the free end of the push rod;
   a resilient medium disposed opposite the first and the second conductive contact and between the substrate and the free end of the push rod; and
   a conductive medium, disposed between the resilient medium and the first and the second conductive contacts, insulating the first conductive contact from the second conductive contact when the free end of the push rod is in the first position and electrically coupling the first conductive contact to the second conductive contact when the free end of the push rod is in the second position.

2. The hinge actuated switch apparatus in accordance with claim 1 wherein the resilient medium further comprises a silicone rubber pad.

3. The hinge actuated switch apparatus in accordance with claim 1 wherein said conductive medium further comprises conductive particles combined with the resilient medium providing a conductive surface on the resilient medium opposite the first and the second conductive contacts.

4. The hinge actuated switch apparatus in accordance with claim 1 further comprising means for attaching the free end of the push rod to said resilient medium.

5. The hinge actuated switch apparatus in accordance with claim 1 wherein the means for translating further comprises:
   an end portion of the push rod, opposite the free end, having a slot disposed therein essentially perpendicular to the linear movement of the free end of the push rod;
   an essentially cylindrical pin having a first end eccentrically attached to an end surface of the hinge shaft, and a second end at least partially disposed within the slot; and
   a guide on the push rod slidably intercoupled with a channel in the second housing portion constraining the free end of the push rod to linear movement.

6. The hinge actuated switch apparatus in accordance with claim 1 wherein the second rotational position of the first housing portion is disposed between the first rotational position and a third rotational position, the hinge actuated switch apparatus further comprising a third position of linear movement of the free end of the push rod, responsive to the means for translating, corresponding to the third position of rotational movement of the first housing portion, insulating the first conductive contact from the second conductive contact.

7. A hinge actuated switch apparatus for a foldable telephone apparatus having a body portion and a flip element portion, the flip element portion having at least two positions of rotation relative to the body portion, a first position of rotation parallel to a front surface plane of the body portion and a second position of rotation at a first obtuse angle to the front surface plane of the body portion, the hinge actuated switch apparatus comprising:
   an essentially cylindrical hinge shaft, attached to one end of the flip element portion, rotatably coupling the flip element portion to the body portion about an axis of rotation through a diametric center of the hinge shaft;
   an essentially planar substrate positioned within the body portion essentially parallel to the axis of rotation;

a push rod, perpendicularly disposed to the axis of rotation and having a free end capable of linear movement between at least a first and a second position within the body portion;

an end portion of the push rod, opposite the free end, having a slot disposed therein essentially perpendicular to the linear movement of the free end of the push rod;

an essentially cylindrical pin having a first end eccentrically attached to an end surface of the hinge shaft, and a second end at least partially disposed within the slot;

means for slidably constraining the linear movement of the free end of the push rod between the first and the second position responsive to the rotational movement of the flip element portion between the first and the second position, respectively;

a first and a second conductive contact disposed on the substrate and essentially opposite the free end of the push rod;

a resilient medium disposed opposite the first and the second conductive contact and between the substrate and the free end of the push rod; and a conductive medium, disposed on the resilient medium between the resilient medium and the first and the second conductive contact, insulating the first conductive contact from the second conductive contact when the free end of the push rod is in the first position and electrically coupling the first conductive contact to the second conductive contact when the free end of the push rod is in the second position.

8. The hinge actuated switch apparatus in accordance with claim 7 wherein said resilient medium further comprises a silicone rubber pad.

9. The hinge actuated switch apparatus in accordance with claim 7 wherein said conductive medium further comprises conductive particles combined with said resilient medium providing a conductive surface on said resilient medium opposite the first and the second conductive contacts.

10. The hinge actuated switch apparatus in accordance with claim 7 further comprising means for attaching the free end of the push rod to said resilient medium.

11. The hinge actuated switch apparatus in accordance with claim 7 wherein the means for slidably constraining further comprises a guide on the push rod intercoupled with a channel in the body portion to constrain the free end of the push rod to linear movement.

12. The hinge actuated switch apparatus in accordance with claim 7 wherein the second rotational position of the flip element portion is disposed between the first rotational position and a third rotational position, the hinge actuated switch apparatus further comprising a third position of linear movement of the free end of the push rod, responsive to the means for translating, corresponding to the third position of rotation the flip element portion, insulating the first conductive contact from the second conductive contact.

13. A hinge actuated switch apparatus for an electronic device having a first and a second housing portion, the first housing portion capable of rotational movement between at least a first and a second position relative to the second housing portion, the hinge actuated switch apparatus comprising:

an essentially cylindrical hinge shaft, attached to one end of the first housing portion, rotatably coupling the first housing portion to the second housing portion about an axis of rotation through a diametric center of the hinge shaft;

an essentially planar substrate positioned within the second housing portion essentially parallel to the axis of rotation;

a push rod, perpendicularly disposed to the axis of rotation and having a free end capable of linear movement between at least a first and a second position within the second housing portion;

means for translating the rotational movement of the first housing portion between the first and the second position to the linear movement of the free end of the push rod between the first and the second position, respectively; and a switch, mounted to the substrate and opposing the free end of the push rod, having an open circuit state when the free end of the push rod is in the first position and a closed circuit state when the free end of the push rod is in the second position.

14. The hinge actuated switch apparatus in accordance with claim 13 wherein the means for translating further comprises:

an end portion of the push rod, opposite the free end, having a slot disposed therein essentially perpendicular to the linear movement of the free end of the push rod;

an essentially cylindrical pin having a first end eccentrically attached to an end surface of the hinge shaft, and a second end at least partially disposed within the slot; and a guide on the push rod slidably intercoupled with a channel in the second housing constraining the free end of the push rod to linear movement.

15. The hinge actuated switch apparatus in accordance with claim 13 wherein the switch further comprises a first and a second conductive contact disposed on the substrate and essentially opposite the free end of the push rod.

16. The hinge actuated switch apparatus in accordance with claim 15 further comprising:

a resilient medium disposed opposite the first and the second conductive contact and between the substrate and the free end of the push rod; and a conductive medium, disposed on the resilient medium between the resilient medium and the first and the second conductive contact, insulating the first conductive contact from the second conductive contact when the free end of the push rod is in the first position and electrically coupling the first conductive contact to the second conductive contact when the free end of the push rod is in the second position.

17. The hinge actuated switch apparatus in accordance with claim 13 wherein the second position of rotation of the first housing portion is disposed between the first position of rotation and a third position of rotation, the hinge actuated switch apparatus further comprising a third position of linear movement of the free end of the push rod, responsive to the means for translating, corresponding to the third position of rotational movement of the first housing portion, causing the switch to have the open circuit state.

* * * * *